Patented Jan. 11, 1938

2,104,959

UNITED STATES PATENT OFFICE 2,104,959

PURIFICATION OF SUGAR JUICES

George E. G. von Stietz, Berkeley, Calif., assignor to Shell Development Company, San Francisco, Calif., a corporation of Delaware No Drawing. Application September 17, 1934, Serial No. 744,367

10 Claims. (Cl. 127—50)

This invention relates to the manufacture of sugar and more particularly to the clarification and purification of sugar juices and syrups. It is particularly concerned with a method for decolorizing sugar solutions without recourse to the usual sulfur dioxide saturations.

The present invention may be considered as an alternative procedure and as an improvement on certain steps in the process of copending application Serial No. 725,894 filed by me May 16, 1934 wherein the use of ammonium sulfite, particularly in the early stages of juice or syrup clarification, is claimed and the introduction of ammonium salts as the first step in the clarification, before the addition of lime, is described. I have now discovered that when ammonium sulfite is used in, or directly after, the final carbonation of the juice or syrup, new and unexpected advantages, not obtainable by similar additions at other stages of the clarification process, may be realized.

For the purpose of affording a clear understanding of my invention, but without imposing limitation thereon, as it is applicable to any sugar clarification process, it will be described with more particular reference to the manufacture of sugar from sugar beets to which it is particularly well adapted. In the usual methods employed in beet sugar manufacture, it has been found necessary to subject the sugar juices or syrups, to treatment with sulfur dioxide gas in order to produce sugar of an acceptable color. This treatment always results in the inclusion of objectionable amounts of sulfur dioxide in the finished product which seriously limit its use. This is especially true of its use in commercial canning, preserving and like operations where the presence of even very small amounts of sulfur dioxide may cause spoilage of the product when put up in metal containers. This has been explained as being due to a catalytic effect of the sulfur dioxide on the organic material present whereby organic acids present, or set free, are activated and attack the container, generate internal pressure which causes "swollen" cans, discolor the pack, and render the product unsalable. As a result beet sugar has been excluded from this important outlet.

Whatever the true explanation of these undesirable results, I have found that they may be readily and completely avoided and the sulfur dioxide saturation of beet sugar juices or syrups may be obviated at all stages of the manufacturing procedure while producing a beet sugar of acceptable color which meets the sulfur specification of the canning industry. This may be accomplished by effecting the decoloration of the juice or syrup by means of sulfite ions ($SO_3^=$) which, I have discovered, do not become incorporated in the sugar as does the sulfur dioxide in the sulfur dioxide gas absorbed by the thick juice and/or syrup in the usual procedure. In order to effectively supplant both the thin and thick juice sulfur dioxide saturations customarily employed, the sulfite ions ($SO_3^=$) should be added in, or directly after, the final carbonation of the limed juice. In carrying out my invention, I preferably add the sulfite ions in the form of ammonium sulfite as the ammonia may be conveniently eliminated in the evaporations to which the juice is subjected in its usual subsequent treatment.

My invention may be carried out in conjunction with any of the usual carbonation methods of clarification, supplementing the use of sulfur dioxide in certain processes. It gives advantageous results irrespective of the previous treatment of the limed juice or syrup. As is well known, however, a rigorous control of the hydrogen ion concentration of the juice or syrup is desirable at all stages of the clarification in any method of procedure.

The present improved procedure may be made the final step in the usual double carbonation process of beet sugar clarification. More preferably it is applied in connection with the improved method of clarification disclosed in my copending application previously referred to, for by that procedure the added advantage of economy in the use of lime is also obtained. It may be used in such a clarification method either with or without the "precarbonation" step therein described. In either case it may be used either as a supplement to, or in lieu of, the ammonium salt additions there mentioned.

Sufficient ammonium sulphite should be added during, or after, the last carbonation so that the hydrogen ion concentration of the resulting evaporator thick juice is lowered to a point which will permit the production of sugar of good color upon crystallization. At the same time the addition of ammonium sulphite should be restricted so that the hydrogen ion concentration of the final syrup will not become so high as to promote undue losses by inversion.

To insure the presence of sufficient sulfite ions to effect the desired decoloration of the juice, the ammonium sulfite is added in an amount somewhat greater than that necessary for reaction with the dissolved calcium compounds which would ordinarily be present after the final carbonation of the juice. Only very small amounts of ammonium sulphite, usually less than about 0.05% of the juice weight, are required when the addition is made at the last stage of the clarification.

In the following detailed illustrative example of an application of my invention to the manufacture of beet sugar, it will be understood that the quantities of reagent used and the condition of operation specified, particularly as regards hydrogen ion concentrations of the juice, are applicable only under similar conditions of beet character and the like, and that with different beets variation of these factors may be required to yield optimum results.

Raw diffusion juice obtained from early season sugar beets was subjected to the usual procedure of continuous first carbonation, liming, settling and filtration, whereby the bulk of the precipitable material was removed. It was then found to have, on the average during four days of factory operation at a slicing rate of about 1600 tons of beets per day, a hydrogen ion concentration of about $2 \times 10^{-12}$ to $3 \times 10^{-12}$ (pH about 11.2 to 11.5); and a lime salt content (as CaO) of about 0.075 to 0.100 grams per 100 c. c. of juice of about 14 Brix. This was subjected to a second carbonation treatment which was carried out in two tanks. The $CO_2$ addition was conducted in the first tank and the juice circulated between the two tanks by means of a pump. Ammonium sulfite, equivalent to about 0.03–0.04% of the juice weight, was added to the second tank in the form of an approximately 31% solution in water.

When the hydrogen ion concentration of the circulated juice had reached a value of about $10^{-8}$ to $2.5 \times 10^{-9}$ or a pH value of about 8.0 to 8.4, the juice was withdrawn through heaters to a waiting tank where it was kept for about ten minutes to allow for completion of the precipitation of the mixed calcium salts ($CaCO_3$ and $CaSO_3$) formed. It was then heated in preheaters and open juice boilers and filtered in the usual way. Undue concentration at this stage is preferably avoided as evaporation of 2% of the volume of the juice, for example, may alter the composition of the evolved gases from a $CO_2$ to $NH_3$ ratio of about 20 to 1 to about 5 to 1 with a consequent change in the hydrogen ion concentration of the juice, which should preferably be brought to the optimum point for elimination of lime salts. The filtered thin juice was then found to have a hydrogen ion concentration of about $3 \times 10^{-9}$ to $10^{-9}$ or a pH value of about 8.5 to 9.0 and a lime salt content (as CaO) of about 0.038 grams per 100 grams of dry substance. This may be compared with the usual factory results, at this stage of the clarification, of about 0.074 grams of lime salts (as CaO) per 100 grams of dry substance.

From the ammonium sulfite treated thin juice, sugar was produced by the usual subsequent refining procedure except that no sulfur dioxide was added at the thick juice blow-ups. The average sulfur content, calculated as $SO_2$, of the sugar produced during four days of factory operation was 0.35 parts per million, with a maximum content of any sample taken of 0.6 parts per million. Products containing less than one part of sulfur dioxide per million parts of sugar are thus seen to be readily obtained. Moreover the sugar so produced was of very good, water white color, averaging about 10 or less as determined by the Lovibond tintometer, i. e. a 200 mm. column of a solution of the sugar in distilled water (50:50) shows a color equal to, or less than, that given by superimposition of Levibond plate yellow =1.0 and Levibond plate red =0.2.

By suitable modification of operating conditions my process may be applied to the clarification and decoloration of cane sugar juices in which the carbonation procedure is not used. In certain cases where carbonation of beet sugar juices is undesirable the clarification may be carried out by liming the juice and treating it with ammonium sulfite without resorting to carbonation, the clarification in such cases being effected by the highly sorptive precipitate of calcium sulfite.

In the foregoing description of my invention I have emphasized the use of ammonium sulfite in my process, but it will be understood that obvious equivalents such as ammonium bisulfite ($NH_4HSO_3$) and the like which yield ions capable of effecting the desired decoloration of the juice and have basic radicals which may be subsequently eliminated from the juice, may also be used.

By ammonium sulfite I mean $(NH_4)_2SO_3$, $(NH_4)HSO_3$, or admixtures thereof with or without conventional modifying agents. In lieu of the preformed salt, one may add the equivalent proportions of free sulfurous acid and ammonia.

It is thus seen that the present invention provides a practical method of purifying sugar solutions which has many advantages over previous processes. The use of ammonium sulfite in or after the last stage of the clarification procedure not only permits a very thorough removal of lime salts but also produces an unusual advance in the degree of purity of the juices as the result of the very high sorptive power of the mixed $CaCO_3$ and $CaSO_3$ precipitate formed. Recourse to sodium salt additions which increase the sugar losses as molasses is avoided as are all sulfur dioxide saturations. The result is a high yield of sugar of good color which is far below the maximum limit of 2 parts of $SO_2$ per million imposed by commercial canning requirements, whereas the beet sugar produced by previous methods contains on the average about 25 parts of $SO_2$ per million.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. In a method of purifying a sugar solution, the steps which comprise adding an ammonium sulfite thereto in the final clarification stage thereof, carbonating to a hydrogen ion concentration of about $10^{-8}$ to about $2.5 \times 10^{-9}$, and then decreasing the hydrogen ion concentration thereof of about $3 \times 10^{-9}$ to about $10^{-9}$ before removing impurities therefrom.

2. In a method of purifying a sugar solution the steps of adding an ammonium sulfite thereto after carbonating to a hydrogen ion concentration thereof in the last stage of the clarification of about $10^{-8}$ to about $2.5 \times 10^{-9}$ and then decreasing the hydrogen ion concentration thereof of about $3 \times 10^{-9}$ to about $10^{-9}$ before removing impurities therefrom.

3. In a method of purifying a sugar solution, the steps which comprise adding ammonium sulfite thereto in the final clarification stage, carbonating the solution to a hydrogen ion concentration of about $10^{-8}$ to about $2.5 \times 10^{-9}$ and then heating the solution until a hydrogen ion concentration of about $3 \times 10^{-9}$ to about $10^{-9}$ is attained therein before removing impurities therefrom.

4. In a method of purifying a sugar solution the steps of adding lime and ammonium sulfite to a sugar solution and precipitating impurities essentially solely by heating the mixture to evaporate off ammonia therefrom and to bring the hydrogen ion concentration to within the range of about $3 \times 10^{-9}$ to $10^{-9}$.

5. A method of purifying beet sugar solutions which comprises liming the solution, adjusting the hydrogen ion concentration of the limed solution to from about $2 \times 10^{-12}$ to about $3 \times 10^{-12}$, separating the resulting precipitate, increasing the hydrogen ion concentration of the partially purified solution to from about $10^{-8}$ to about $2.5 \times 10^{-9}$ by carbonation while adding ammonium sulfite thereto and subsequently decreasing the hydrogen ion concentration to from about $3 \times 10^{-9}$ to about $10^{-9}$ and again separating precipitated impurities.

6. A method of purifying limed beet sugar solutions from which the bulk of the precipitable impurities have been removed which comprises adding ammonium sulfite thereto and adjusting the hydrogen ion concentration thereof to from about $10^{-8}$ to about $2.5 \times 10^{-9}$ by carbonation, maintaining the resulting mixture in a heated condition for sufficient time to substantially complete the precipitation of the mixed calcium salts formed and then separating impurities at a hydrogen ion concentration of from about $3 \times 10^{-9}$ to about $10^{-9}$.

7. A method of purifying beet sugar solutions from which the bulk of the impurities precipitable by liming and carbonating have been removed, which comprises carbonating the partially purified solution to a hydrogen ion concentration of from about $10^{-8}$ to about $2.5 \times 10^{-9}$ while adding ammonium sulfite thereto and subsequently heating the solution to reduce the hydrogen ion concentration to from about $3 \times 10^{-9}$ to about $10^{-9}$ and separating the resulting precipitated impurities.

8. In a method of purifying sugar solutions containing undesired lime salts, the steps of adding ammonium sulfite thereto while carbonating to a pH value of from about 8.0 to about 8.4, then raising the alkalinity of said solution, by removal of carbon dioxide therefrom, to a pH value of from about 8.5 to about 9.0 and subsequently removing the resulting precipitate.

9. In a method of purifying a sugar solution, the steps which comprise adding an ammonium sulfite thereto during final carbonation thereof to a hydrogen ion concentration of about $10^{-8}$ to about $2.5 \times 10^{-9}$ and then adjusting the hydrogen ion concentration to a value of about $3 \times 10^{-9}$ to about $10^{-9}$ by heating the solution before removal of impurities.

10. In a method of purifying a sugar solution from which the bulk of the precipitable material has been removed, the steps which comprise carbonating the solution to a hydrogen ion concentration of about $10^{-8}$ to about $2.5 \times 10^{-9}$, adding an ammonium sulfite, heating the solution to drive off carbon dioxide therefrom and reduce the hydrogen ion concentration to about $3 \times 10^{-9}$ to about $10^{-9}$ and then removing the impurities thereby precipitated.

GEORGE E. G. VON STIETZ.